United States Patent [19]

Johnson

[11] Patent Number: 5,695,639
[45] Date of Patent: Dec. 9, 1997

[54] VACUUM FILTER FUNNEL

[75] Inventor: James S. Johnson, Acton, Mass.

[73] Assignee: Micron Separations, Inc., Westborough, Mass.

[21] Appl. No.: 593,948

[22] Filed: Jan. 30, 1996

[51] Int. Cl.⁶ .................................. B01D 29/085
[52] U.S. Cl. ............... 210/474; 210/477; 210/482; 210/406
[58] Field of Search .................. 210/445, 446, 210/447, 461, 453, 455, 464, 469, 482, 497.01, 474, 477, 406

[56] References Cited

U.S. PATENT DOCUMENTS

| | | | |
|---|---|---|---|
| 2,784,843 | 3/1957 | Braunlich | 210/164 |
| 3,295,686 | 1/1967 | Krueger | 210/455 |
| 3,831,759 | 8/1974 | Gelman et al. | 210/232 |
| 4,468,321 | 8/1984 | St. John | 210/474 |
| 4,959,150 | 9/1990 | Degen | 210/500.24 |

*Primary Examiner*—W. L. Walker
*Attorney, Agent, or Firm*—Bruce Jacobs

[57] ABSTRACT

A greatly simplified improved vacuum filter funnel consists of two pieces, namely an upper reservoir member and a lower spout member. The upper reservoir member has an annular ring downwardly extending from the bottom thereof which fits inside an annular rim upwardly extending from the top of the lower spout member. A filter disk rests on an integral grid at the top of the lower spout member and is held in place between the upper and lower members by solely the weight of the upper member. The filter disk is readily removed after simply lifting up the upper reservoir member. Both the reservoir and spout members are preferably constructed of a chemical and heat resistant organic plastic, for example polysulfone, so that the parts may be sterilized in an autoclave.

13 Claims, 3 Drawing Sheets

VACUUM FILTER FUNNEL

BACKGROUND OF THE INVENTION

The present invention relates to an improved filter device of the general type commonly used in chemical or other laboratories for the vacuum filtration of liquids wherein the filter need be readily removable as, for example, in gravimetric analyses where it is desired to qualitatively or quantitatively identify the amount of solids filtered from a liquid.

BACKGROUND OF THE INVENTION

U.S. Pat. No. 3,831,759 discloses a multi-part filter device for filtering liquids comprising a reservoir member for receiving the liquid to be filtered and a spout member for exit of the liquid after it has been filtered, these members being assembled with a filter disc therebetween, one of the members being provided with an annular magnet and the other of the members being provided with an annular magnet or an annulus of other ferro-magnetic material such that the magnetic attraction sealingly clamps the filter disc between the members during the filtration. Although, the filter devices of this patent were in common use, and had the advantage that they could be rapidly assembled and disassembled when desired for insertion and removal of the filter disc, a problem has been that the magnetic and ferromagnetic materials are subject to deterioration. Such deterioration can be from corrosion due to contact with acidic or other corrosive liquids or from chipping or cracking where ceramic magnets are used. The latter in particular is a problem in that ceramic magnets, such as those of the alkaline metal or alkaline earth metal ferrites, while otherwise being excellent because of their light weight, relatively low cost and high magnetic strength, are disadvantageous by reason of their susceptibility to chipping or cracking, as well as changes in magnetic strength over time. Furthermore, the filter medium support grid in the spout member does not allow for uniform flow distribution or uniform retentate distribution which causes problems in, e.g., retained bacteria counts.

U.S. Pat. No. 4,468,321 discloses an improvement over U.S. Pat. No. 3,831,759, in the use of ceramic magnets in a filter device. The reservoir member and the spout member are constructed of organic plastic and each provided with an annular ceramic magnet to provide a high magnetic attraction to firmly seal and clamp a filter disc in place. The annular ceramic magnet of the reservoir member is completely enclosed within a closed annular cavity in the organic plastic of the reservoir member. The annular magnet is of smaller size than the annular cavity. The spout member likewise contains a completely enclosed ceramic magnet within an annular cavity in the organic plastic of the spout member and this annular magnet is also of smaller size than the cavity. Although the filter funnel is effective as a filter and overcomes the problem of deterioration of the magnetic elements of U.S. Pat. No. 3,831,759, the structure and manufacture was relatively complicated for a filter funnel. The prior art filter funnels described are, moreover, constructed of a relative large number of parts for such a simple device.

Thus there is a need for a filter funnel that is both effective for the purpose intended, yet simple and inexpensive to manufacture and simple to use.

It is therefore an object of the invention to provide a filter funnel that is constructed of a single upper reservoir member and a single lower spout member.

A further object is to provide a filter funnel that is easily manufactured by molding of the members from an organic plastic material.

Yet another object is to provide a filter funnel consisting of an upper reservoir member and a lower spout member that hold a filter medium in place therebetween in the absence of any additional means such as magnets, clamps, velcro strips or the like.

A further object of the invention is to provide a filter funnel wherein the filter medium is readily removable.

Still another object is to provide a filter funnel which is of an autoclavable material, and wherein the upper and lower members are nestable so as to permit a larger number of filter funnels to be simultaneously placed in an autoclave for sterilization.

Still another object is to provide a filter funnel which provides uniform flow and uniform retentate particle distribution across the filter medium.

These and other objects of the invention will become apparent as the description thereof proceeds.

SUMMARY OF THE INVENTION

The filter funnel of the present invention generally comprises only two members, namely an upper reservoir member and a lower spout member. In use a filter disk is placed atop the lower spout member and the upper reservoir member then rests upon the filter disk, pinching the filter disk against the lower spout member and sealing it in place. The upper reservoir member is of sufficient weight to form a seal of the filter disk against the lower spout member suitable to use the filter funnel in vacuum filtrations. Both the upper reservoir and lower spout members are molded from a chemical and heat resistant material, preferably an organic plastic material such as a polysulfone, so that they may be sterilized in an autoclave.

The upper reservoir member is in the general shape of an inverted frustrum of a cone, open at the top and bottom thereof, with the diameter of the bottom opening being smaller than the diameter of the top, and further has a depending annular ring section. The lower spout member has a flat head portion with a central grid (for supporting a filter disk) and an upwardly extending annular rim. The depending annular ring section of the upper reservoir fits into the upwardly extending annular rim of the lower spout member to form the unitary filter funnel. The filter disk is sealed in place between the two members. The annular rim of the lower spout member is designed to fit around the annular ring section of the upper reservoir member to properly locate the upper reservoir member when the two members are brought together. The upper reservoir member is of sufficient weight to form the seal. To use the filter funnel, the lower spout member is first held in place above a filtrate receiving container. A fluid to be filtered is poured into the opening in the top of the upper reservoir member, passes through the filter disk and central grid of the lower spout member, and finally out the tubular portion of the lower spout member. Material removed by the filter disk may be analyzed as desired. To sterilize the vacuum filter funnel of the present invention in an autoclave, the lower spout member may be nested within the upper reservoir member to reduce the total space required.

Thus, the present invention provides an improved filter funnel which is both simple to manufacture and simple to use, since it contains only two parts, whereas the above-described prior art filter funnels are made of at least seven parts. The present filter funnel requires less work for disassembly and cleaning than prior filter funnels and eliminates the possible loss or breakage of small parts. The filter funnel of the present invention is an inventive improvement over the prior art.

DETAILED DESCRIPTION OF THE INVENTION

Figure 1:
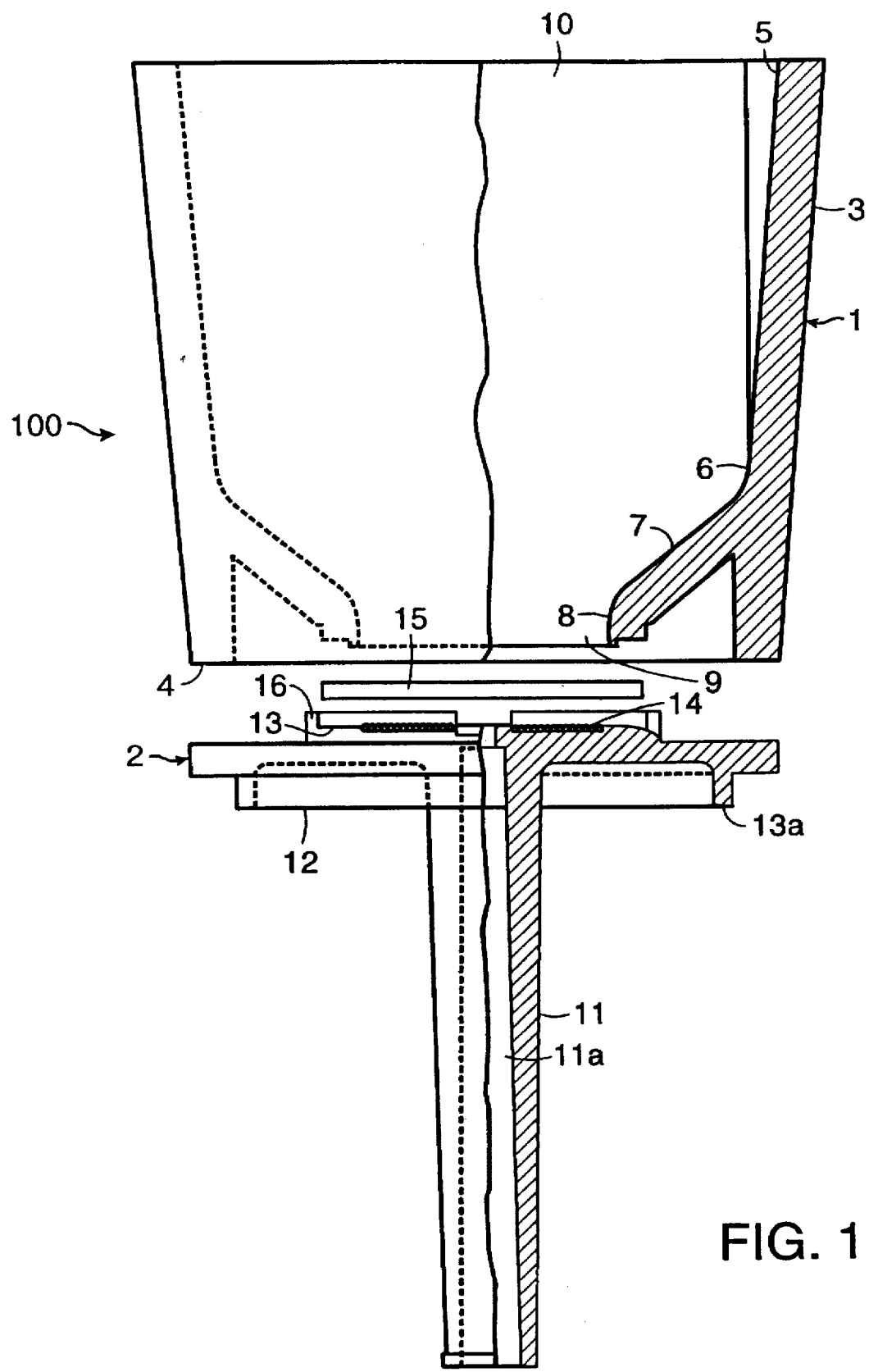
FIG. 1 is a view in elevation of the filter funnel of the invention with the upper reservoir and lower spout members separated and sectioned along the lines 1—1 of FIG. 2.

The invention may be better understood by reference to the drawings. As best shown in FIG. 1 filter funnel 100 generally comprises an upper reservoir 1 which is positioned upon a lower spout 2. Upper reservoir 1 comprises outer wall 3 which terminates with a lower flat annular base 4. It further includes inner wall 5 which tapers inwardly at 6 to form a separate sloping inner wall 7 terminating in a downwardly extending vertical annular ring 8. There is a smaller outlet opening 9 at the base of the upper reservoir 1 as compared with the inlet opening 10.

The lower spout 2 has an upper head portion 12 and a bottom tubular portion 11. Upper head portion 12 comprises a flat annular area 13, a central grid 14, and a raised annular rim 16. As shown, the flat annular area 13, the central grid 14, and the raised annular rim 16 are integral with each other. Alternatively, the raised annular rim 16 may be formed as a separate element and attached to upper head 12 by any suitable means such as an epoxy adhesive. The raised annular rim 16 is located on the flat annular area 13 beyond the periphery of the central grid 14. The central grid 14 contains openings 17 so that the fluid can flow therethrough. The central grid 14 provides physical support to a filter disk 15 and effects the uniformity of the flow of fluid through the filter funnel. The raised annular rim 16 preferably contains filter placement slots 18 to permit easy placement and removal of a sterile filter disk by forceps or the like. The bottom tubular portion 11 has an inner conduit 11a through which the fluid passing through filter disk 15 and central grid 14 flows into a fluid-receiving container (not shown). The lower spout member 2 may also contain an annular depending rim 13a which will serve to properly locate the lower spout member 2 within upper reservoir member 1 when the members are nested together to save space for purposes such as storage and sterilization by autoclave.

Figure 2:
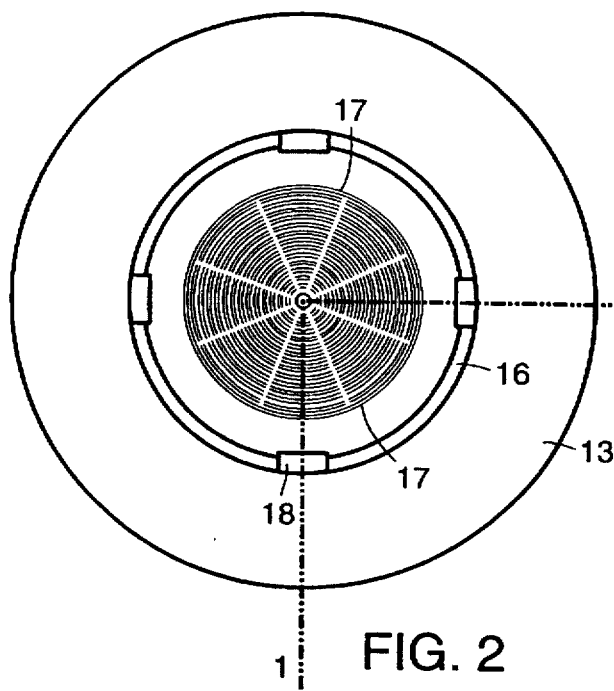
FIG. 2 is a top plan view of the lower spout member showing the filter disk supporting grid.
Figure 7:
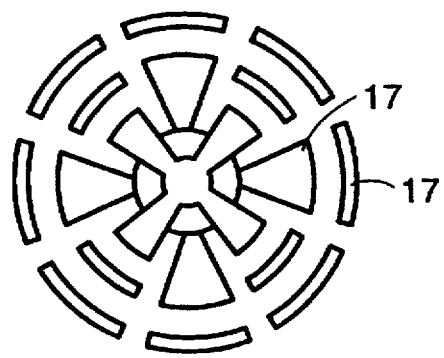
FIG. 7 is an enlarged top plan view in detail of the central portion of the filter disk supporting grid shown in FIG. 2.

A preferred orientation of central grid 14 showing the fluid flow openings 17 therein is shown generally in FIG. 2. FIG. 7 shows a preferred central portion of the central grid of FIG. 2.

The two members of the filter funnel are designed to fit together when used. Specifically, the downwardly extending vertical annular ring 8 of the upper reservoir member 1 has an inside diameter which is less than the diameter of the filter disk 15 and an outside diameter which is less than the inside diameter of the raised annular rim 16 on the lower spout member 2. Thus, the upper reservoir member i is properly situated atop the edge of the filter disk 15 and the lower spout member 2. For a preferred filter funnel prepared from polysulphone polymer and designed for use with a 47 mm filter disk in the bacterial analysis of water, the inner diameter of the downwardly extending annular ring 8 should be about 37 mm, the outer diameter of the downwardly extending annular ring 8 should be about 39 mm, and the inner diameter of the raised annular rim 16 should be about 48.5 mm.

Figure 3:
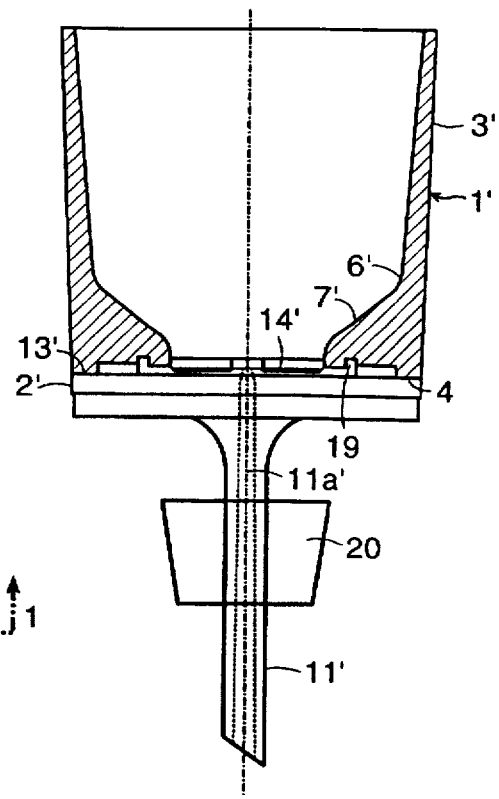
FIG. 3 is a view in elevation of a slightly modified construction of the filter funnel, with the upper reservoir member in cross-section in place atop the lower spout member due to the annular locating rings.

In operation when the two members are assembled to form a filter funnel, the lower spout member 2 will first be held in place above a suitable container, e.g. a filtrate receiving vacuum flask (not shown) or a vacuum manifold (not shown) when multiple samples are filtered through multiple filter funnels simultaneously, by any suitable means such as a silicone rubber stopper 20 as shown in FIG. 3. The filter disk 15 will be placed above the central grid 14 and the upper reservoir member 1 placed atop the filter disk 15. The downwardly extending annular ring 8 of the upper reservoir member 1 seals the edge of the filter disk 15 by pinching it against the lower spout member 2. The seal is formed due to the upper reservoir member being of sufficient weight in view of the force of gravity. Since suitable filter disks for use herein have a thickness of about 50 to 500, preferably about 75 to 200 microns, in use the downwardly extending annular ring 8 of the upper reservoir member 1 does not normally make direct contact with the flat annular area 13 of the lower spout member 2 and there is no need for clamps (which require two hands for assembly or disassembly) or magnets or any other retaining device to hold the two filter funnel members together to seal the filter disk. The upper reservoir member 1 may be readily removed with one hand and a filter disk 15 inserted or removed, e.g. with sterile forceps. A suitable weight for the upper reservoir member 1 which will enable it to form the seal will depend upon the size of the filter disk, but can generally be any weight greater than about 1 ounce. For use of a 47 mm filter disk, the upper reservoir member 1 will preferably weigh at least 4 ounces and more preferably at least 6 ounces.

Suitable filter media for use herein include natural and synthetic materials such as filter paper, cellulosic resins including nitrocellulose and cellulose acetate, nylon, polyester, and the like.

Referring to FIG. 3 which shows a slightly modified construction of the filter funnel of this invention, inner sloping wall 7' is formed as a solid extension of wall 3' rather than as a separate wall 7 as in FIG. 1. There is some advantage to the structure of FIG. 1, in that the upper reservoir member 1 can be molded without the necessity of forming a recess 19 as in FIG. 3. In the embodiment of FIG. 3, the raised annular rim 16' fits within recess 19 on the lower base of upper reservoir member 1'. The annular base 4' of upper reservoir member 1 rests on the top flat annular area 13' of spout 2'. Central grid 14' is similar to the central grid 14 of FIG. 2. A rubber stopper 20 is shown for holding the filter funnel vertically above a container (not shown) during use to receive the filtered fluid from tube 11'.

Figure 4:
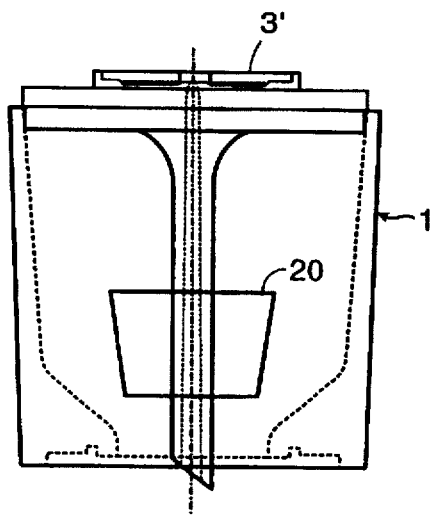
FIGS. 4 and 5 are views in elevation showing the upper and lower members of the filter funnel in nested position for placement in an autoclave, with a stopper in different placement.
Figure 5:
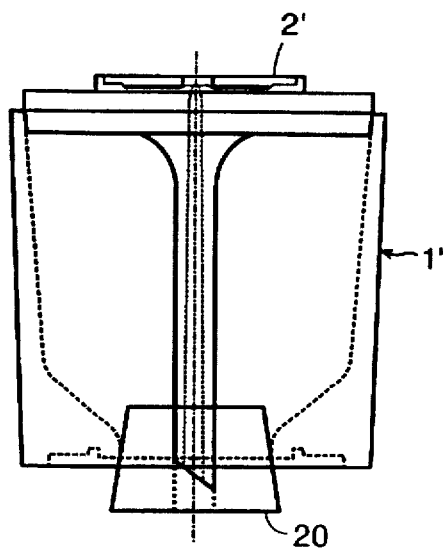

One advantage of the present filter funnel is that the two members are nestable to minimize space requirements needed for storage either when not in use or when sterilized in an autoclave. FIGS. 4 and 5 show two alternative storage placements of the embodiment of FIG. 3. As shown, the lower spout 2,2' is nestable within upper reservoir 1,1'. In FIG. 4, the stopper 20 is located on the lower spout member 2 and placed inside the upper reservoir 1 for maximum space saving. In FIG. 5, the stopper 20 is placed on the lower portion of bottom tubular portion 11' of the lower spout member 2' to more firmly secure the lower spout member 2' within upper reservoir member 1'.

Figure 6A:
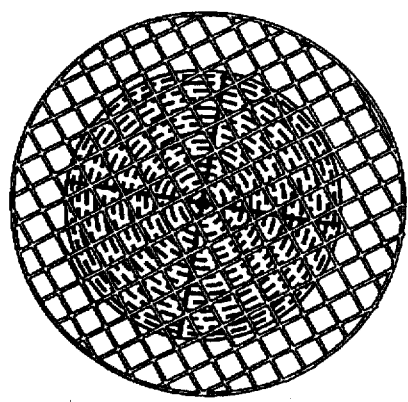
FIGS. 6a and 6b are respectively filter patterns formed by a dyed filter fluid in the filter funnel of the present invention and a filter funnel according to the prior art, showing blinded off portions of the filter paper in the prior art.
Figure 6B:
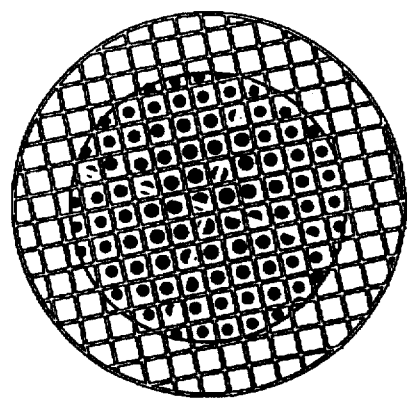

FIGS. 6a and 6b illustrate samples of filter media after a fluid dye solution was filtered through, respectively, a filter funnel of the present invention (FIG. 6a), and a filter funnel according to the previously described prior art (FIG. 6b). Identical dye solutions and filter disk media were used for each sample. As can be seen in FIG. 6a, the filter funnel of the present invention generated a filtrate flow pattern in which no portions of the filter disk are blinded off and each of the squares within the superimposed grid contains the same amount of dye. To the contrary, FIG. 6b shows substantial variation in dye concentration within the squares of the superimposed grid and that a substantial portion of the filter disk area has been blinded to flow due to the structure of the filter support grid. Thus the filter funnel of the present invention provides enhanced uniformity of retentate particle distribution on a filter media.

Thus, the improved filter funnel provided by the present invention has at least the following advantages: a simpler design with only two elements as compared to the seven element prior art filter funnels; ease and simplicity of manufacture; fewer parts to damage, distort or break; no clamps, threads or magnets used to join the elements together and thus no possible contamination from rust during the multiple autoclave cycles to which the filter funnel will be exposed during its useful life; nestable to save space in autoclaving; easy, one-handed operation; and an integral filter support with no hidden crevices to cause contamination. It will be further understood, that although the certain specific embodiments have been described, such as an inverted conical section for the reservoir, such reservoir could be cylindrical, and various other modifications of the invention could be made without departing from the spirit of the invention or the scope of the appended claims.

What is claimed is:

1. A filter funnel comprising (I) an upper reservoir member having a downwardly extending vertical annular ring positioned on top of (II) a lower spout member having a central grid for supporting a filter disk and a flat annular area surrounding the central grid, said upper reservoir member and said lower spout member sealing a filter disk placed therebetween during use solely due to the weight of the upper reservoir member and without clamps or magnets or any other retaining device to hold the upper reservoir member and the lower spout member together to maintain the downwardly extending vertical annular ring of the upper reservoir member in sealed contact with the filter disk which filter disk is maintained in sealed contact with the flat annular area of the lower spout member.

2. The filter funnel of claim 1, wherein the upper reservoir member is of sufficient weight to form a seal of the filter disk against the lower spout member suitable to use the filter funnel in vacuum filtrations.

3. The filter funnel of claim 1, wherein the central grid is integral with the flat annular area.

4. The filter funnel of claim 1, wherein the central grid comprises a plurality of concentric slits surrounding a central aperture.

5. The filter funnel of claim 1, wherein the central grid has a distribution of holes such that a uniform retentate particle distribution occurs on the filter disk.

6. The filter funnel of claim 5, wherein the central grid comprises a plurality of concentric slits.

7. The filter funnel of claim 1, wherein said spout member comprises a lower tubular portion and a head portion, said head portion having a size and shape which permits it to fit within and nest in the top opening of said reservoir member.

8. The filter funnel of claim 1, wherein said upper reservoir member and said lower spout member are formed from an organic plastic material that is chemically and heat resistant.

9. The filter funnel of claim 8, wherein said organic plastic material is polysulfone.

10. The filter funnel of claim 1, wherein the lower spout member has a raised annular rim which contains at least one slot to assist removal of the filter medium by forceps.

11. The filter funnel of claim 1, wherein the upper reservoir member weighs at least 1 ounce.

12. The filter funnel of claim 1, wherein the filter disk has a diameter of about 47 mm and the upper reservoir member weighs at least 4 ounces.

13. The filter funnel of claim 1, wherein the filter disk has a diameter of about 47 mm and the upper reservoir member weighs at least 6 ounces.

* * * * *

UNITED STATES PATENT AND TRADEMARK OFFICE
CERTIFICATE OF CORRECTION

PATENT NO. : 5,695,639

DATED : Dec. 9, 1997

INVENTOR(S) : Johnson et al.

It is certified that error appears in the above-identified patent and that said Letters Patent is hereby corrected as shown below:

On the title page, item [75],

Inventor: Please add the following two people:

Lars McKim, Dedham, Mass.
Robert D. Cotta, Billerica, Mass.

Signed and Sealed this

Third Day of March, 1998

*Attest:*

BRUCE LEHMAN

*Attesting Officer*   Commissioner of Patents and Trademarks